(12) United States Patent
Barreto et al.

(10) Patent No.: US 8,862,141 B2
(45) Date of Patent: Oct. 14, 2014

(54) SYSTEMS, METHODS, AND APPARATUSES FOR FACILITATING ALLOCATION OF A COMMON RESOURCE TO A TERMINAL

(75) Inventors: Luis Miguel Santos Barreto, Gloucestershire (GB); Marcus Wimmer, Wroclaw (PL); Masatoshi Nakamata, Kanagawa (JP); Karri Markus Ranta-aho, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/321,135

(22) PCT Filed: May 10, 2010

(86) PCT No.: PCT/FI2010/050372
§ 371 (c)(1),
(2), (4) Date: Apr. 18, 2012

(87) PCT Pub. No.: WO2010/133754
PCT Pub. Date: Nov. 25, 2010

(65) Prior Publication Data
US 2012/0196609 A1    Aug. 2, 2012

Related U.S. Application Data

(60) Provisional application No. 61/179,137, filed on May 18, 2009.

(51) Int. Cl.
*H04W 72/00*    (2009.01)
*H04W 72/04*    (2009.01)

(52) U.S. Cl.
CPC ........ *H04W 72/0406* (2013.01); *H04W 72/048* (2013.01)
USPC .......................................... 455/450; 370/329

(58) Field of Classification Search
CPC .............. H04W 72/04; H04W 72/042; H04W 72/0406; H04W 72/048
USPC ................... 455/442, 450; 370/310, 329, 345
See application file for complete search history.

(56) References Cited

U.S. PATENT DOCUMENTS

2006/0193275 A1*   8/2006   Umesh et al. ................. 370/310
2007/0155390 A1*   7/2007   Kodikara Patabandi et al. ............................. 455/450

(Continued)

FOREIGN PATENT DOCUMENTS

EP    0 935 894 B1    1/2005
EP    1689133 A1    8/2006

(Continued)

OTHER PUBLICATIONS

"3rd Generation Partnership Project; Technical Specification Group Radio Access Network; High Speed Downlink Packet Access (HSDPA); Overall description; Stage 2 (Release 7)", 3GPP TS 25.308 v7.9.0, Dec. 2008, pp. 1-51.

"3rd Generation Partnership Project; Technical Specification Group Radio Access Network; Enhanced uplink; Overall description; Stage 2 (Release 8)", 3GPP TS 25.319, v8.5.0, Mar. 2009, pp. 1-65.

(Continued)

*Primary Examiner* — Nathan Taylor
(74) *Attorney, Agent, or Firm* — Alston & Bird LLP

(57) ABSTRACT

Systems, methods, and apparatuses are provided for facilitating allocation of a common resource to a terminal. A method may include transmitting one or more inbound packet data units including an indication of a category of a terminal and an indication of an identity of the terminal to a network node responsible for managing allocation of a common resource to the terminal. The method may further include receiving an absolute grant of a portion of the common resource to the terminal, wherein the absolute grant is issued by the network node based at least in part upon the transmitted indication of the category of the terminal. Corresponding systems and apparatuses are also provided.

20 Claims, 5 Drawing Sheets

(56) References Cited

U.S. PATENT DOCUMENTS

| | | | |
|---|---|---|---|
| 2008/0225764 A1* | 9/2008 | Tseng | 370/310 |
| 2008/0254804 A1* | 10/2008 | Lohr et al. | 455/442 |
| 2009/0103511 A1* | 4/2009 | Marinier et al. | 370/345 |
| 2009/0116432 A1* | 5/2009 | Ma et al. | 370/329 |
| 2010/0284314 A1* | 11/2010 | Pelletier et al. | 370/310 |
| 2011/0038342 A1* | 2/2011 | Lindskog et al. | 370/329 |
| 2012/0039290 A1* | 2/2012 | Vrzic et al. | 370/329 |
| 2012/0069805 A1* | 3/2012 | Feuersanger et al. | 370/329 |

FOREIGN PATENT DOCUMENTS

| | | | |
|---|---|---|---|
| EP | 1708523 | A1 | 10/2006 |
| EP | 1971048 | A2 | 9/2008 |
| JP | 2006-254390 | A | 9/2006 |
| WO | WO-2007/143947 | A1 | 12/2007 |

OTHER PUBLICATIONS

"3rd Generation Partnership Project; Technical Specification Group Radio Access Network; Medium Access Control (MAC) protocol specification (Release 7)", 3GPP TS 25.321, v7.11.0, Dec. 2008, pp. 1-147.

"3rd Generation Partnership Project; Technical Specification Group Radio Access Network; Physical layer procedures (FDD) (Release 7)", 3GPP TS 25.214, v7.10.0, Dec. 2008, pp. 1-87.

International Search Report and Written Opinion received for corresponding Patent Cooperation Treaty Application No. PCT/FI2010/050372, dated Aug. 25, 2010, 13 pages.

Office Action for Chinese Application No. 201080026546.4; dated Nov. 15, 2013.

Substantive Examination Report (Stage 1) for the Indonesian Patent Office, Application No. W00201104572; dated Sep. 9, 2013.

Office Action from Chinese Application No. 201080026546.4, dated Jul. 28, 2014.

* cited by examiner

SYSTEMS, METHODS, AND APPARATUSES FOR FACILITATING ALLOCATION OF A COMMON RESOURCE TO A TERMINAL

This application is a National Stage Entry of International Application No. PCT/FI2010/050372, filed May 10, 2010, which claims the benefit of U.S. Provisional Patent Application No. 61/179,137, filed May 18, 2009.

TECHNOLOGICAL FIELD

Embodiments of the present invention relate generally to communication technology and, more particularly, relate to systems, methods, and apparatuses for facilitating allocation of a common resource to a terminal.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. Some evolving wireless and mobile networking technologies, such as the universal mobile telecommunications system (UMTS) terrestrial radio access network (UTRAN), provide for the allocation of a common resource, such as, for example, a radio uplink to multiple mobile terminals, also referred to as user equipments (UEs).

BRIEF SUMMARY OF SOME EXAMPLES OF THE INVENTION

Systems, methods, apparatuses, and computer program products are therefore provided for facilitating allocation of a common resource to a terminal. In this regard, methods, apparatuses, and computer program products are provided that may provide several advantages to computing devices and network operators. Some example embodiments provide an enhanced mobile terminal configured to transmit an indication of a category of the mobile terminal to a network node responsible for managing allocation of a common resource to the mobile terminal. In this regard, some example embodiments provide for extension of inbound signaling, such as through medium access control inbound (MAC-i) signaling, to transmit an indication of the category of a mobile terminal. In some example embodiments, the indication of the category is transmitted along with an identity of the mobile terminal. Some example embodiments provide for transmission of a mobile terminal category for a mobile terminal over an enhanced uplink in one or more of CELL_FACH state or idle mode. Some example embodiments also provide for an enhanced network node configured to receive MAC-i signaling from a mobile terminal and to allocate a portion of a common resource to the mobile terminal based at least in part upon an indication of the category of the mobile terminal included in the received MAC-i signaling. Accordingly, some example embodiments facilitate allocation of a common resource to a mobile terminal without wasting resource reservation through allocation of a larger portion of the common resource to the mobile terminal than the mobile terminal is capable of utilizing.

In a first example embodiment, a method is provided, which comprises transmitting one or more inbound packet data units comprising an indication of a category of a terminal and an indication of an identity of the terminal to a network node responsible for managing allocation of a common resource to the terminal. The method of this embodiment further comprises receiving an absolute grant of a portion of the common resource to the terminal, wherein the absolute grant is issued by the network node based at least in part upon the transmitted indication of the category of the terminal.

The common resource of this embodiment may comprise an enhanced dedicated channel resource. Transmitting the one or more inbound packet data units may comprise transmitting one or more inbound packet data units comprising a header including the indication of the category of the terminal and the indication of the identity of the terminal. The header may further comprise a logical channel identification field comprising an indication that the header also includes the indication of the category of the terminal and the indication of the identity of the terminal. Transmitting the one or more inbound packet data units may comprise transmitting the one or more inbound packet data units over an enhanced data channel, wherein the terminal is in one or more of CELL_FACH state or idle mode. Transmitting the one or more inbound packet data units may comprise transmitting one or more medium access control inbound packet data units. Transmitting the one or more medium access control inbound packet data units may comprise transmitting one or more medium access control inbound packet data units comprising the indication of the category of the terminal and the indication of the identity of the terminal only during a collision resolution phase and the method may further comprise following conclusion of the collision resolution phase upon receipt of the absolute grant, transmitting one or more medium access control inbound packet data units without the indication of the category of the terminal and without the indication of the identity of the terminal. Transmitting the one or more inbound packet data units may comprise transmitting one or more inbound packet data units over one or more of a dedicated traffic channel or a dedicated control channel. The indication of the identity of the terminal of this embodiment may comprise an enhanced dedicated channel radio network temporary identifier of the terminal.

Receiving the absolute grant may comprise receiving an absolute grant on an enhanced absolute grant channel along with the indication of the identity of the terminal.

In another example embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction of this embodiment is for causing one or more inbound packet data units comprising an indication of a category of a terminal and an indication of an identity of the terminal to be transmitted to a network node responsible for managing allocation of a common resource to the terminal. The second program instruction of this embodiment is for causing an absolute grant of a portion of the common resource to the terminal to be received, wherein the absolute grant is issued by the network node based at least in part upon the transmitted indication of the category of the terminal.

In another example embodiment, an apparatus is provided. The apparatus of this embodiment includes a processor and a memory storing instructions that when executed by the processor cause the apparatus to transmit one or more inbound packet data units comprising an indication of a category of a terminal and an indication of an identity of the terminal to a network node responsible for managing allocation of a common resource to the terminal. The instructions of this embodiment when executed by the processor further cause the apparatus to receive an absolute grant of a portion of the common resource to the terminal, wherein the absolute grant is issued by the network node based at least in part upon the transmitted indication of the category of the terminal.

In another example embodiment, an apparatus is provided, which comprises means for transmitting one or more inbound packet data units comprising an indication of a category of a terminal and an indication of an identity of the terminal to a network node responsible for managing allocation of a common resource to the terminal. The apparatus of this embodiment further comprises means for receiving an absolute grant of a portion of the common resource to the terminal, wherein the absolute grant is issued by the network node based at least in part upon the transmitted indication of the category of the terminal.

In another example embodiment, a method is provided, which comprises receiving one or more inbound packet data units sent by a terminal, wherein the received inbound packet data units comprise an indication of a category of the terminal and an indication of an identity of the terminal. The method of this embodiment further comprises allocating a portion of a common resource to the terminal based at least in part upon the received category of the terminal. The method of this embodiment further comprises transmitting an absolute grant of the allocated portion of the common resource to the terminal.

The common resource of this embodiment may comprise an enhanced dedicated channel resource. Receiving the one or more inbound packet data units may comprise receiving the one or more inbound packet data units over an enhanced data channel, wherein the terminal is in one or more of CELL_FACH state or idle mode. Receiving the one or more inbound packet data units may comprise receiving one or more medium access control inbound packet data units. Receiving the one or more medium access control inbound packet data units may comprise receiving one or more medium access control inbound packet data units comprising an indication of the category of the terminal and the indication of the identity of the terminal only during a collision resolution phase and the method may further comprise following conclusion of the collision resolution phase upon transmitting the absolute grant, receiving one or more medium access control inbound packet data units without the indication of the category of the terminal and without the indication of the identity of the terminal. Receiving the one or more inbound packet data units may comprise receiving one or more inbound packet data units over one or more of a dedicated traffic channel or a dedicated control channel. The indication of the identity of the terminal of this embodiment may comprise an enhanced dedicated channel radio network temporary identifier of the terminal.

Receiving the one or more inbound packet data units may comprise receiving one or more inbound packet data units comprising a header including the indication of the category of the terminal and the indication of the identity of the terminal. The header may further comprise a logical channel identification field comprising an indication that the header also includes the indication of the category of the terminal and the indication of the identity of the terminal. The method may further comprise extracting the indication of the category of the terminal and the indication of the identity of the terminal from the header of a received inbound packet data unit when the logical channel identification field comprises the indication that the header also includes the indication of the category of the terminal and the indication of the identity of the terminal. The method may further comprise identifying the terminal based at least in part upon the extracted indication of the identity of the terminal and allocating the portion of the common resource to the identified terminal.

Transmitting the absolute grant may comprise transmitting the absolute grant on an enhanced absolute grant channel along with the indication of the identity of the terminal.

In another example embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction of this embodiment is for causing one or more inbound packet data units sent by a terminal to be received, wherein the received inbound packet data units comprise an indication of a category of the terminal and an indication of an identity of the terminal. The second program instruction of this embodiment is for allocating a portion of a common resource to the terminal based at least in part upon the received category of the terminal. The third program instruction of this embodiment is for causing an absolute grant of the allocated portion of the common resource to be transmitted to the terminal.

In another example embodiment, an apparatus is provided. The apparatus of this embodiment includes a processor and a memory storing instructions that when executed by the processor cause the apparatus to receive one or more inbound packet data units sent by a terminal, wherein the received inbound packet data units comprise an indication of a category of the terminal and an indication of an identity of the terminal. The instructions of this embodiment when executed by the processor further cause the apparatus to allocate a portion of a common resource to the terminal based at least in part upon the received category of the terminal. The instructions of this embodiment when executed by the processor further cause the apparatus to transmit an absolute grant of the allocated portion of the common resource to the terminal.

In another example embodiment, an apparatus is provided, which includes means for receiving one or more inbound packet data units sent by a terminal and comprising an indication of a category of the terminal and an indication of an identity of the terminal. The apparatus of this embodiment further comprises means for allocating a portion of a common resource to the terminal based at least in part upon the received category of the terminal. The apparatus of this embodiment further comprises means for transmitting an absolute grant of the allocated portion of the common resource to the terminal.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
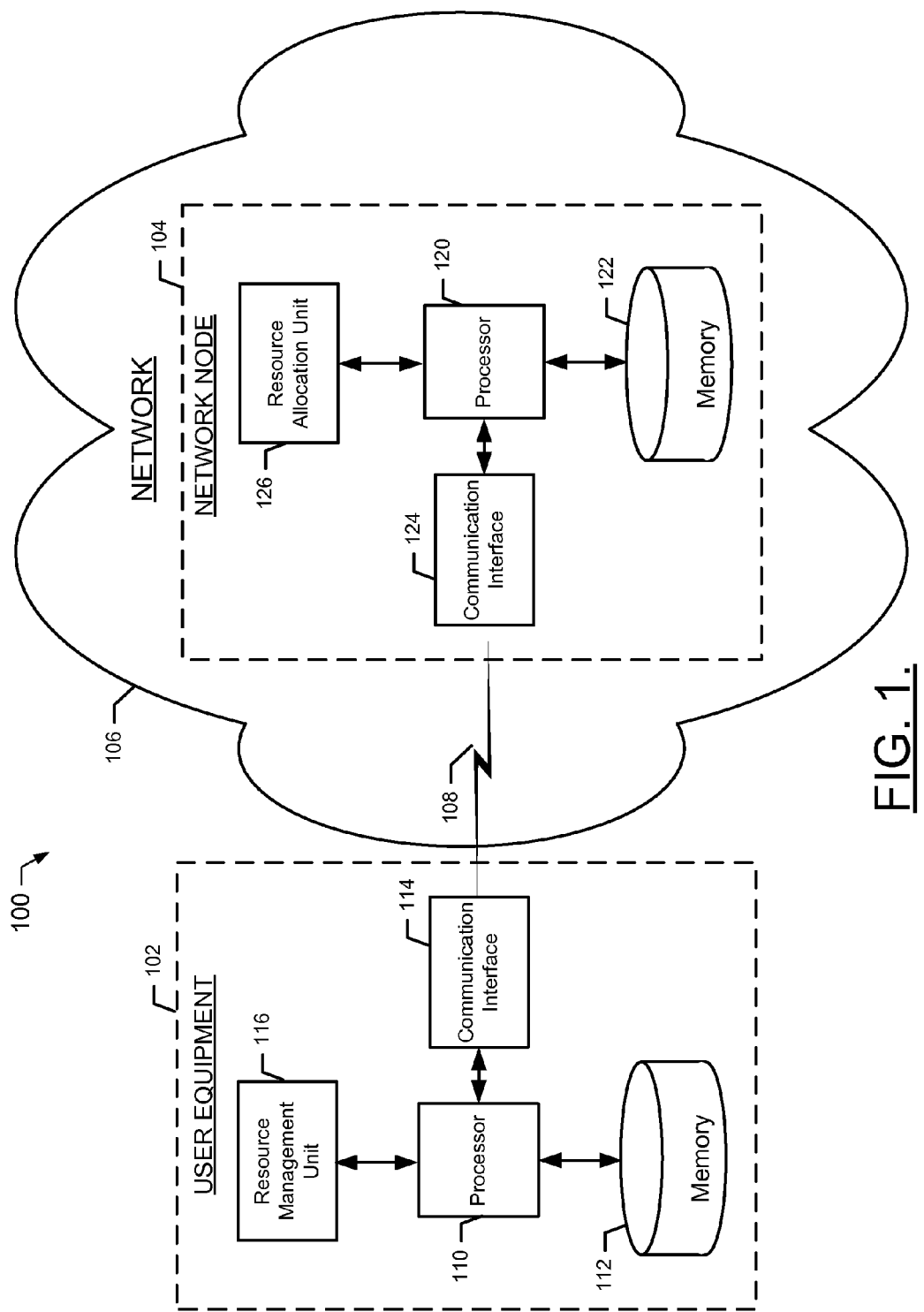
FIG. 1 illustrates a system for facilitating allocation of a common resource to a mobile terminal according to an example embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

A node of an access network, such as a Node B, may signal an absolute grant (AG) to a mobile terminal allocating a portion of the common resource to the mobile terminal. One such common resource that may be shared by and allocated to multiple mobile terminals is an enhanced dedicated channel (E-DCH). When allocating a portion of the common resource to a mobile terminal, it may be desirable for the network node managing allocation of the resource to efficiently allocate the resource such that the resource is not wasted, such as by allocation of a portion of the resource to a mobile terminal that exceeds a use capability of the mobile terminal. However, without knowledge of a capability level of a mobile terminal to which it is allocating a portion of a common resource, the network node managing allocation of the resource may not be able to efficiently allocate the common resource. Currently in some situations, the network node managing allocation of the common resource may not have knowledge of the capability level of a mobile terminal. For example, when allocating a portion of a common E-DCH to a mobile terminal in cell forward access channel (CELL_FACH) state and idle mode, a Node B managing allocation of the common E-DCH resource may not have access to a capability level of a UE to which it is allocating a portion of the E-DCH resource.

Example embodiments of the invention disclosed herein accordingly facilitate allocation of a common resource to a mobile terminal and may address some of the deficiencies of current allocation techniques. FIG. 1 illustrates a block diagram of a system 100 for facilitating allocation of a common resource to a mobile terminal according to an example embodiment of the present invention. It will be appreciated that the scope of the invention encompasses many potential embodiments in addition to those illustrated and described herein. As such, while FIG. 1 illustrates one example of a configuration of a system for facilitating allocation of a common resource to a mobile terminal, numerous other configurations may also be used to implement embodiments of the present invention. Further, it will be appreciated that where references herein are made to specific types of communications networks (e.g., UTRAN) and specific terminology for system entities on a communications network, it will be appreciated that embodiments of the invention are applicable to communications networks not using standards of the referenced network(s) and to system entities performing similar functions to those described herein, but which are referred to using different terminology in accordance with other network standards. Further, it will be appreciated that where reference is made herein to an E-DCH as a common resource allocated to a mobile terminal, it is for purposes of example and embodiments of the invention may facilitate allocation of other common resources to a mobile terminal.

In at least some embodiments, the system 100 includes a user equipment device (UE) 102 and network node 104 configured to communicate over the communications link 108. The network node 104 may reside on a network 106 and may be configured to provide access to the network 104 to one or more UEs 102. In this regard, the network node 104 may comprise, for example, an access point, base station, or the like, and in one embodiment comprises a Node B of a UTRAN or evolved UTRAN (E-UTRAN). The network 106 may comprise any mobile network and may comprise a public land mobile network. In this regard, the network 106 may comprise a network operating in accordance with a cellular networking standard, such as, for example, UTRAN standards, E-UTRAN standards, and/or the like.

The UE 102 may be embodied as a desktop computer, laptop computer, mobile terminal, mobile computer, mobile phone, mobile communication device, game device, digital camera/camcorder, audio/video player, television device, radio receiver, digital video recorder, positioning device, a modem, a modem chipset, a device comprising a modem and/or a modem chipset, any combination thereof, and/or the like that is configured to access the network 106 via the network node 104. In an example embodiment, the UE 102 is embodied as a mobile terminal, such as that illustrated in FIG. 2.

Figure 2:
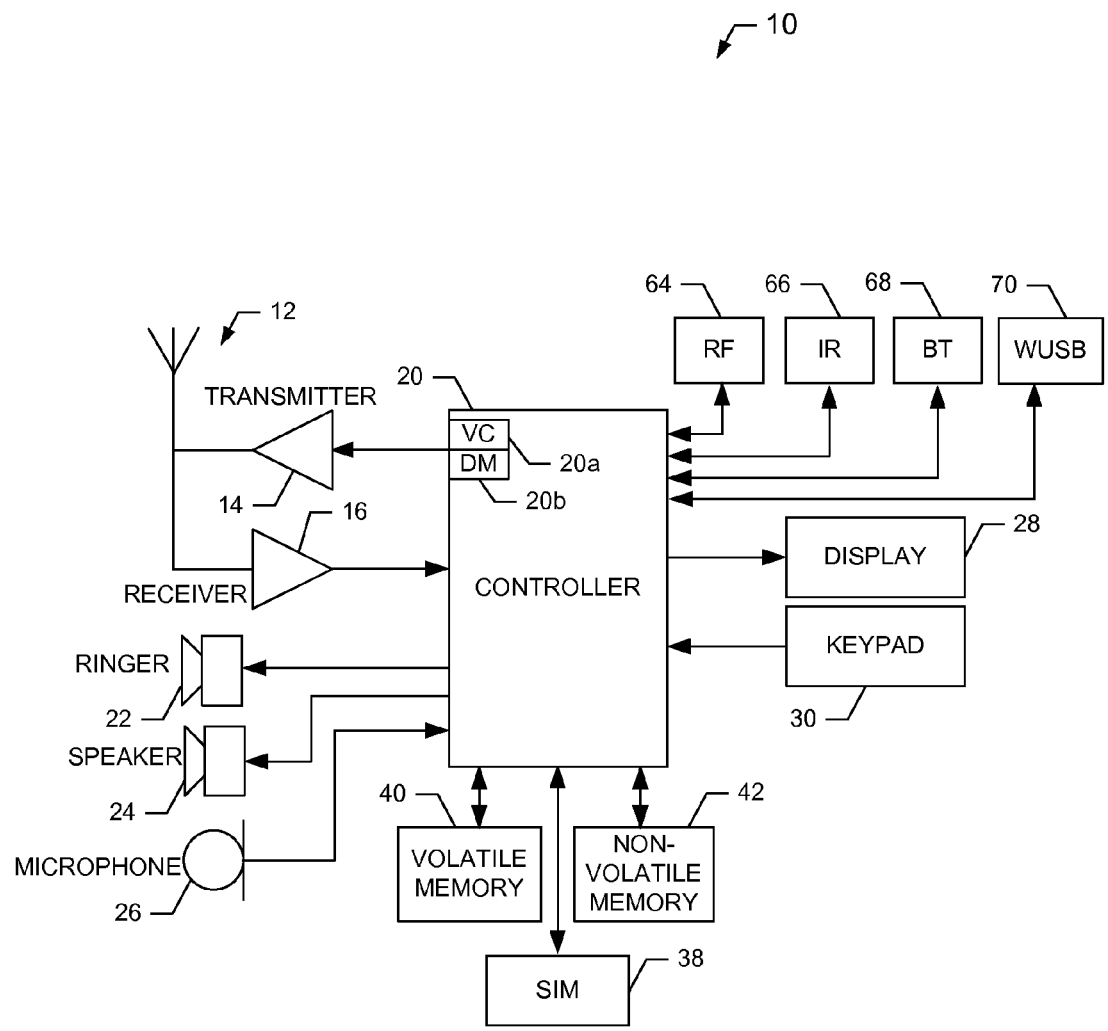
FIG. 2 is a schematic block diagram of a mobile terminal according to an example embodiment of the present invention.

In this regard, FIG. 2 illustrates a block diagram of a mobile terminal 10 representative of one embodiment of a UE 102 in accordance with embodiments of the present invention. It should be understood, however, that the mobile terminal 10 illustrated and hereinafter described is merely illustrative of one type of UE 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the UE 102 includes various means, such as one or more of a processor 110, memory 112, communication interface 114, and resource management unit 116 for performing the various functions herein described. These means of the UE 102 as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

The processor 110 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the UE 102 as described herein. In an example embodiment, the processor 110 is configured to execute instructions stored in the memory 112 or otherwise accessible to the processor 110. These instructions, when executed by the processor 110, may cause the UE 102 to perform one or more of the functionalities of the UE 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may include, for example, volatile and/or non-volatile memory. Although illustrated in FIG. 1 as a single memory, the memory 112 may comprise a plurality of memories. The memory 112 may comprise volatile memory, non-volatile memory, or some combination thereof. In this regard, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 112 may be configured to store information, data, applications, instructions, or the like for enabling the UE 102 to carry out various functions in accordance with example embodiments of the present invention. For example, in at least some embodiments, the UE 102 is configured to buffer input data for processing by the processor 110. Additionally or alternatively, in at least some embodiments, the memory 112 is configured to store program instructions for execution by the processor 110. The memory 112 may store information in the form of static and/or dynamic information. This stored information may be stored and/or used by the resource management unit 116 during the course of performing its functionalities.

The communication interface 114 may be embodied as any device or means embodied in hardware, a computer program product comprising computer readable program instructions stored on a computer readable medium (e.g., the memory 112) and executed by a processing device (e.g., the processor 110), or a combination thereof that is configured to receive and/or transmit data from/to the network node 104 over the communication link 108. In at least one embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver, a modem, a modem chipset, and/or supporting hardware or software for enabling communications with other entities (e.g., the network node 104) of the system 100. The communication interface 114 may be configured to receive and/or transmit data using any protocol that may be used for communications between entities of the system 100. The communication interface 114 may additionally be in communication with the memory 112 and/or resource management unit 116, such as via a bus.

The resource management unit 116 may be embodied as various means, such as hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the resource management unit 116 is embodied separately from the processor 110, the resource management unit 116 may be in communication with the processor 110. The resource management unit 116 may further be in communication with the memory 112 and/or communication interface 114, such as via a bus.

In an example embodiment, the network node 104 includes various means, such as a processor 120, memory 122, communication interface 124, and resource allocation unit 126 for performing the various functions herein described. These means of the network node 104 as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory 122) that is executable by a suitably configured processing device (e.g., the processor 120), or some combination thereof.

The processor 120 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 120 comprises a plurality of processors. The plurality of processors may be embodied on a single computing device or distributed among a plurality of computing devices, which may be collectively configured to function as a network node 104. The plurality of processors may be in operative communication with each other and may be collectively configured to perform one or more functionalities of the network node 104 as described herein. In an example embodiment, the processor 120 is configured to execute instructions stored in the memory 122 or otherwise accessible to the processor 120. These instructions, when executed by the processor 120, may cause the network node 104 to perform one or more of the functionalities of the network node 104 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may include, for example, volatile and/or non-volatile memory. Although illustrated in FIG. 1 as a single memory, the memory 122 may comprise a plurality of memories. The memory 122 may comprise volatile memory, non-volatile memory, or some combination thereof. In this regard, the memory 122 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the network node 104 to carry out various functions in accordance with example embodiments of the present invention. For example, in at least some embodiments, the memory 122 is configured to buffer input data for processing by the processor 120. Additionally or alternatively, in at least some embodiments, the memory 122 is configured to store program instructions for execution by the processor 120. The memory 122 may store information in the form of static and/or dynamic information. This stored information may be stored and/or used by the resource allocation unit 126 during the course of performing its functionalities.

The communication interface 124 may be embodied as any device or means embodied in hardware, a computer program product comprising computer readable program instructions stored on a computer readable medium (e.g., the memory 122) and executed by a processing device (e.g., the processor 120), or a combination thereof that is configured to receive and/or transmit data from/to the UE 102 over the communication link 108. In at least one embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with other entities (e.g., UEs 102) of the system 100. The communication interface 124 may be configured to receive and/or transmit data using any protocol that may be used for communications between computing entities of the system 100. The communication interface 124 may additionally be in communication with the memory 122 and/or resource allocation unit 126, such as via a bus.

The resource allocation unit 126 may be embodied as various means, such as hardware, a computer program product comprising computer readable program instructions stored on a computer readable medium (e.g., the memory 122) and executed by a processing device (e.g., the processor 120), or some combination thereof and, in one embodiment, is embodied as or otherwise controlled by the processor 120. In embodiments wherein the resource allocation unit 126 is embodied separately from the processor 120, the resource allocation unit 126 may be in communication with the processor 120. The resource allocation unit 126 may further be in communication with the memory 122 and/or communication interface 124, such as via a bus.

The resource management unit 116 may be configured to initiate a resource allocation procedure by transmitting an access request to the network node 104. The access request may comprise an access request for allocation of an E-DCH resource through access request preamble transmissions with preamble power ramping. The resource allocation unit 126 may be configured to receive the access request and in response transmit an acquisition indication and assign a common resource, such as a common E-DCH resource, to the UE 102. Upon receipt of the acquisition indication, the resource management unit 116 may be configured to engage in data transmission over the assigned common resource. When the assigned common resource comprises an E-DCH, the resource management unit 116 may be configured to engage in Common Control Channel (CCCH) transmission or Dedicated Traffic Channel (DTCH)/Dedicated Control Channel (DCCH) transmission over the assigned E-DCH channel.

Data transmission over the common resource may, such as when the UE 102 is in radio resource control (RRC) connected mode, initially comprise a collision resolution phase prior to allocation of a portion of the common resource to the UE 102 during which the resource management unit 116 is configured to transmit one or more inbound packet data units (PDUs) to the network node 104. The one or more inbound PDUs may comprise MAC-i PDUs. The UE 102 may be in one or more of CELL_FACH state or idle mode and the one or more inbound PDUs may be transmitted over an enhanced data channel, such as, for example, an enhanced dedicated channel (E-DCH).

In some example embodiments, the resource management unit 116 is configured to include an indication of a category of the UE 102 in the one or more inbound PDUs transmitted to the network node 104. The category of the UE 102 may comprise a set of physical layer protocol capabilities of the UE 102. This set of physical layer protocol capabilities may, for example, comprise an amount of memory of the UE 102 available for use of the common resource, physical processing capabilities of the UE 102 available for use of the common resource, and/or the like. The indication of the category of the UE 102 may, for example, comprise a series of one or more bits recognizable by the network node 104 that indicate the set of physical layer protocol capabilities of the UE 102. The resource management unit 116 may be further configured to include an indication of the identity of the UE 102 in the one or more inbound PDUs transmitted to the network node 104 so that the network node 104 may determine the identity of the UE 102 whose category is signaled in a received inbound PDU. The indication of the identity of the UE 102 may, for example, comprise an E-DCH Radio Network Temporary Identifier (E-RNTI) allocated to the UE 102, such as when the UE 102 is engaging in DTCH/DCCH transmission over a common E-DCH resource when the UE 102 is in RRC connected mode.

Figure 3:
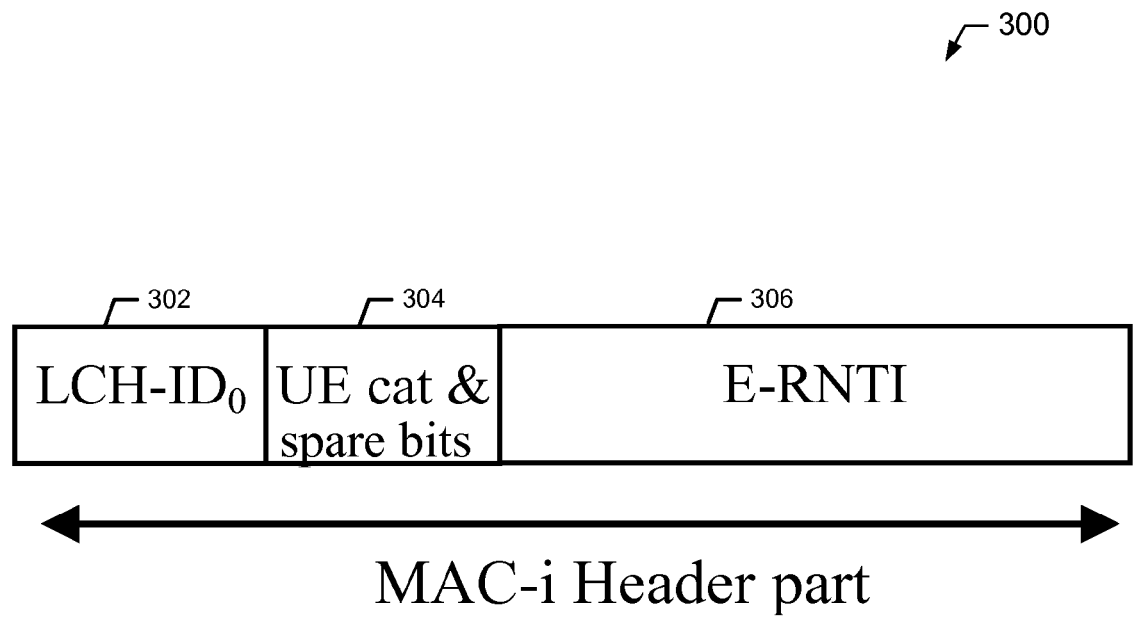
FIG. 3 illustrates a header of an inbound packet data unit according to an example embodiment of the present invention.

In some embodiments, the resource management unit 116 is configured to include the indication of the category of the UE 102 and/or the indication of the identity of the UE 102 in one or more fields of a header of the transmitted inbound PDUs. The resource management unit 116 may be configured to further include a field comprising a flag or other value indicating that the header includes an indication of the category of the UE 102 and/or an indication of the identity of the UE 102 to alert the network node 104 to extract the category and/or identity from the header upon receipt of the inbound PDU. The field, may, for example, comprise a logical channel identification field comprising the value '1111.' FIG. 3 illustrates a header 300 of an inbound PDU according to an example embodiment of the present invention. It will be appreciated that the header 300 is provided for purposes of example to illustrate one embodiment of the invention and other embodiments of the invention may utilize a different selection and/or ordering of fields within the header to provide indications of the category of the UE 102 and/or of the identity of the UE 102 to the network node 104. Further, while the header 300 illustrates a header of a MAC-I PDU, it will be appreciated that similar headers may be included in other types of inbound PDUs according to various example embodiments of the invention. The header 300 may comprise a logical channel identification field (LCH-ID) comprising the value LCH-ID$_0$ (e.g., '1111') that indicates the header additionally includes an indication of the category of the UE 102 and an indication of the identity of the UE 102. The header 300 may additionally comprise a field 302 including the indication of the identity of the UE 102 and zero or more spare bits included in the header to provide for octet alignment of the header bits. The header 300 may further comprise a UE 102 identity field comprising the E-RNTI of the UE 102.

The resource allocation unit 126 may be configured to receive one or more inbound PDUs sent by the UE 102, such as during a collision resolution phase, and extract the indication of the category of the UE 102 from an inbound PDU. The resource allocation unit 126 may also determine the set of capabilities of the UE 102 based at least in part upon the extracted category of the UE 102. The resource allocation unit 126 may further be configured to allocate a portion of the shared resource to the UE 102 based at least in part upon the extracted category of the UE 102 and/or determined set of capabilities of the UE 102. In this regard, the resource allocation unit 126 may be configured to allocate a portion of the shared resource to the UE 102 that does not exceed the limits of the physical layer use capabilities of the UE 102. The resource allocation unit 126 may be further configured to take into account the available portion of the shared resource when allocating a portion of the shared resource to the UE 102. In this regard, the resource allocation unit 126 may be configured to not allocate a larger portion of the shared resource to the UE 102 than that which is available and thus may take into account portions of the resource already allocated to other devices (e.g., other UEs 102). The resource allocation unit 126 may, for example, track resource allocation in a resource allocation table stored in the memory 122 and may consult the resource allocation table when allocating a portion of the shared resource to the UE 102.

In response to receipt of an inbound PDU including an indication of the identity of the UE 102, the resource allocation unit 126 may be configured to extract the indication of the identity of the UE 102 and determine the identity of the UE 102 such that the resource allocation unit 126 may allocate a portion of the shared resource to the identified UE 102.

In embodiments wherein a received inbound PDU includes a header, such as, for example, the header 300, the resource allocation unit 126 may be configured to determine whether the header 300 includes a flag or other value (e.g., LCH-ID$_0$) indicating the header includes an indication of the category of the UE 102 that transmitted the inbound PDU and/or an indication of the identity of the UE 102 that transmitted the inbound PDU. When the header does include such a value, the resource allocation unit 126 may be configured to extract the indication of the category of the UE 102 and/or indication of the identity of the UE 102 from the header.

After the resource allocation unit 126 has allocated a portion of the common resource to the UE 102, the resource allocation unit 126 may be configured to transmit an absolute grant (AG) of the allocated portion of the common resource to the UE 102. The resource allocation unit 126 may be configured to transmit the AG by transmitting the AG on an enhanced absolute grant channel (E-AGCH) along with an indication of the identity of the UE 102. The indication of the identity of the UE 102 transmitted by the allocation unit 126 may, for example, comprise the E-RNTI allocated to the UE 102 and may signal an end to a collision resolution phase. In this regard, the resource allocation unit 126 may be configured to transmit a message comprising the AG as a payload and the E-RNTI as a destination address identifying the UE 102 to which the AG is transmitted.

The resource management unit 116 may be configured to receive the AG, such as, for example, by receiving a message comprising the AG as a payload and the E-RNTI for the UE 102. When engaged in a collision resolution phase, such as for DTCH/DCCH transmission in RRC connected mode, and the resource management unit 116 receives the E-RNTI allocated to the UE 102 or other indication of the identity of the UE 102 along with the AG, the resource management unit 116 may be configured to determine that the collision resolution phase has concluded. A collision resolved phase may ensue following conclusion of the collision resolution phase. During the collision resolved phase, the resource management unit 116 may be configured to transmit one or more inbound PDUs (e.g., MAC-i PDUs) to the network node 104 without an indication of the category of the UE 102 and without an indication of the identity of the UE 102 (e.g., without the E-RNTI of the UE 102).

If the portion of the common resource allocated to the UE 102 in the AG exceeds the capabilities of the UE 102, the resource management unit 116 may be configured to use a portion of the common resource corresponding to the maximum portion supported by the category of the UE 102.

Figure 4:
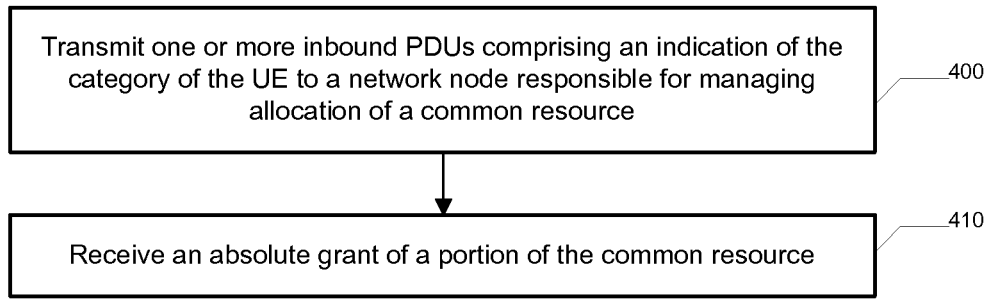
FIGS. 4-5 illustrate flowcharts according to example methods for facilitating allocation of a common resource to a mobile terminal according to example embodiments of the invention.

FIG. 4 illustrates a flowchart according to an example method for facilitating allocation of a common resource to a mobile terminal according to an example embodiment of the invention. In this regard, FIG. 4 illustrates operations that may occur at the UE 102. The method may include the resource management unit 116 transmitting one or more inbound PDUs comprising an indication of the category of the UE to the network node 104 responsible for managing allocation of the common resource, at operation 400. Operation 410 may comprise the resource management unit 116 receiving an absolute grant of a portion of the common resource allocated to the UE 102 by the network node 104.

Figure 5:
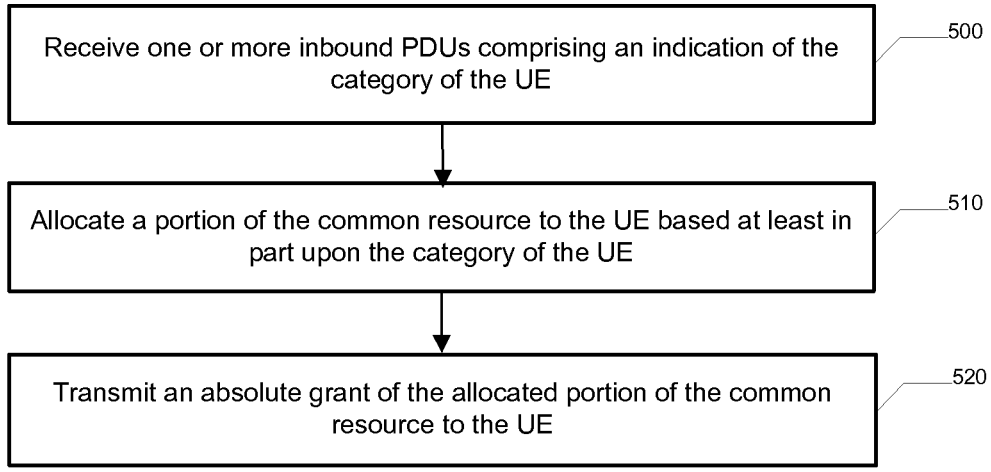

FIG. 5 illustrates a flowchart according to an example method for facilitating allocation of a common resource to a mobile terminal according to an example embodiment of the invention. In this regard, FIG. 5 illustrates operations that may occur at the network node 104. The method may include the resource allocation unit 126 receiving one or more inbound PDUs sent by the UE 102 that comprise an indication of the category of the UE 102, at operation 500. Operation 510 may comprise the resource allocation unit 126 allocating a portion of the common resource to the UE 102 based at least in part upon the category of the UE 102. The resource allocation unit 126 may transmit an absolute grant of the allocated portion of the common resource to the UE 102, at operation 520.

FIGS. 4-5 are flowcharts of a system, method, and computer program product according to example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements. In another embodiment, all or a portion of the elements may be configured by and operate under control of a computer program product. The computer program product for performing the methods of various example embodiments includes a computer-readable storage medium, such as the non-volatile storage medium, and computer-readable program code portions, such as a series of computer instructions, embodied in the computer-readable storage medium.

As such, then, some example embodiments provide several advantages to computing devices and network operators. Some example embodiments provide an enhanced mobile terminal configured to transmit an indication of a category of the mobile terminal to a network node responsible for managing allocation of a common resource to the mobile terminal. In this regard, some example embodiments provide for extension of inbound signaling, such as through medium access control inbound (MAC-i) signaling, to transmit an indication of the category of a mobile terminal. In some example embodiments, the indication of the category is transmitted along with an identity of the mobile terminal. Some example embodiments provide for transmission of a mobile terminal category for a mobile terminal over an enhanced uplink in one or more of CELL_FACH state or idle mode. Some example embodiments also provide for an enhanced network node configured to receive MAC-i signaling from a mobile terminal and to allocate a portion of a common resource to the mobile terminal based at least in part upon an indication of the category of the mobile terminal included in the received MAC-i signaling. Accordingly, some example embodiments facilitate allocation of a common resource to a mobile terminal without wasting resource reservation through allocation of a larger portion of the common resource to the mobile terminal than the mobile terminal is capable of utilizing.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    causing transmission of one or more inbound packet data units comprising an indication of a category of a terminal and an indication of an identity of the terminal to a network node responsible for managing allocation of a common resource to the terminal, wherein the category of the terminal comprises a set of physical layer protocol capabilities of the terminal that includes an amount of memory of the terminal available for use of the common resource and a physical processing capability of the terminal available for use of the common resource; and
    receiving an absolute grant of a portion of the common resource to the terminal, wherein the absolute grant is issued by the network node based at least in part upon the transmitted indication of the category of the terminal.

2. The method of claim 1, wherein the common resource comprises an enhanced dedicated channel resource.

3. The method of claim 1, wherein causing transmission of one or more inbound packet data units comprises causing transmission of the one or more inbound packet data units over an enhanced data channel, and wherein the terminal is in one or more of CELL_FACH state or idle mode.

4. An apparatus comprising at least one processor and at least one memory storing computer program code, wherein the at least one memory and stored computer program code are configured, with the at least one processor, to cause the apparatus to at least:
cause transmission of one or more inbound packet data units comprising an indication of a category of the apparatus and an indication of an identity of the apparatus to a network node responsible for managing allocation of a common resource to the apparatus, wherein the category of the apparatus comprises a set of physical layer protocol capabilities of the apparatus that includes an amount of memory of the terminal available for use of the common resource and a physical processing capability of the terminal available for use of the common resource; and
receive an absolute grant of a portion of the common resource to the apparatus, wherein the absolute grant is issued by the network node based at least in part upon the transmitted indication of the category of the apparatus.

5. The apparatus of claim 4, wherein the common resource comprises an enhanced dedicated channel resource.

6. The apparatus of claim 4, wherein the at least one memory and stored computer program code are configured, with the at least one processor, to cause the apparatus to cause transmission of one or more inbound packet data units by causing transmission of one or more inbound packet data units comprising a header including the indication of the category of the apparatus and the indication of the identity of the apparatus.

7. The apparatus of claim 6, wherein the header further comprises a logical channel identification field comprising an indication that the header also includes the indication of the category of the apparatus and the indication of the identity of the apparatus.

8. The apparatus of claim 4, wherein the at least one memory and stored computer program code are configured, with the at least one processor, to cause the apparatus to cause transmission of one or more inbound packet data units by causing transmission of the one or more inbound packet data units over an enhanced data channel, and wherein the apparatus is in one or more of CELL_FACH state or idle mode.

9. The apparatus of claim 4, wherein the at least one memory and stored computer program code are configured, with the at least one processor, to cause the apparatus to cause transmission of one or more inbound packet data units by causing transmission of one or more medium access control inbound packet data units.

10. The apparatus of claim 9, wherein the at least one memory and stored computer program code are configured, with the at least one processor, to cause the apparatus to cause transmission of the one or more medium access control inbound packet data units by causing transmission of one or more medium access control inbound packet data units comprising the indication of the category of the apparatus and the indication of the identity of the apparatus only during a collision resolution phase, and wherein the at least one memory and stored computer program code are configured, with the at least one processor, to further cause the apparatus to:
following conclusion of the collision resolution phase and in response to receipt of the absolute grant, cause transmission of one or more medium access control inbound packet data units without the indication of the category of the apparatus and without the indication of the identity of the apparatus.

11. The apparatus of claim 4, wherein the at least one memory and stored computer program code are configured, with the at least one processor, to cause the apparatus to cause transmission of one or more inbound packet data by causing transmission of one or more inbound packet data units over one or more of a dedicated traffic channel or a dedicated control channel.

12. The apparatus of claim 4, wherein the indication of the identity of the apparatus comprises an enhanced dedicated channel radio network temporary identifier of the apparatus.

13. The apparatus of claim 4, wherein the indication of the category of the apparatus indicates a set of physical layer protocol capabilities of the apparatus.

14. The apparatus of claim 4, wherein the at least one memory and stored computer program code are configured, with the at least one processor, to cause the apparatus to receive the absolute grant on an enhanced absolute grant channel along with the indication of the identity of the apparatus.

15. The apparatus of claim 4, wherein the apparatus comprises or is embodied on a mobile phone, the mobile phone comprising a user interface configured to:
facilitate user control of at least some functions of the mobile phone through use of a display; and
cause at least a portion of a user interface of the mobile phone to be displayed on the display to facilitate user control of at least some functions of the mobile phone.

16. A computer program product comprising at least one non-transitory computer-readable storage medium having computer-readable program instructions stored therein, wherein the computer-readable program instructions, when executed, cause:
transmission of one or more inbound packet data units comprising an indication of a category of a terminal and an indication of an identity of the terminal to a network node responsible for managing allocation of a common resource to the terminal, wherein the category of the terminal comprises a set of physical layer protocol capabilities of the terminal that includes an amount of memory of the terminal available for use of the common resource and a physical processing capability of the terminal available for use of the common resource; and
receipt of an absolute grant of a portion of the common resource to the terminal, wherein the absolute grant is issued by the network node based at least in part upon the transmitted indication of the category of the terminal.

17. The computer program product of claim 16, wherein the common resource comprises an enhanced dedicated channel resource.

18. The computer program product of claim 16, wherein the computer program product is embodied on a mobile phone.

19. An apparatus comprising at least one processor and at least one memory storing computer program code, wherein the at least one memory and stored computer program code are configured, with the at least one processor, to cause the apparatus to at least:
receive one or more inbound packet data units sent by a terminal, wherein the received inbound packet data units comprise an indication of a category of the terminal and an indication of an identity of the terminal, wherein the category of the terminal comprises a set of physical layer protocol capabilities of the terminal that includes an amount of memory of the terminal available for use of the common resource and a physical processing capability of the terminal available for use of the common resource;

allocate a portion of a common resource to the terminal based at least in part upon the received category of the terminal; and cause transmission of an absolute grant of the allocated portion of the common resource to the terminal.

20. The apparatus of claim 19, wherein the common resource comprises an enhanced dedicated channel resource.

* * * * *

UNITED STATES PATENT AND TRADEMARK OFFICE
CERTIFICATE OF CORRECTION

Page 1 of 1

PATENT NO. : 8,862,141 B2
APPLICATION NO. : 13/321135
DATED : October 14, 2014
INVENTOR(S) : Barreto et al.

It is certified that error appears in the above-identified patent and that said Letters Patent is hereby corrected as shown below:

On the Title page,
Item (75) "Marcus Wimmer" should read --Markus Wimmer--.

Signed and Sealed this
Second Day of June, 2015

Michelle K. Lee
*Director of the United States Patent and Trademark Office*